INVENTOR.
GEORGE G. BERNARD

INVENTOR.
GEORGE G. BERNARD
BY Dean Sandford
ATTORNEY

United States Patent Office 3,529,668
Patented Sept. 22, 1970

3,529,668
FOAM DRIVE OIL RECOVERY PROCESS
George G. Bernard, La Mirada, Calif., assignor to Union Oil Company of California, Los Angeles, Calif., a corporation of California
Filed July 24, 1968, Ser. No. 747,240
Int. Cl. E21b 43/20, 43/22
U.S. Cl. 166—273          11 Claims

ABSTRACT OF THE DISCLOSURE

A process for recovering oil from porous subterranean reservoirs in which a bank of foam is established in the reservoir and displaced through the reservoir toward a spaced production well by the injection of a combination of gaseous and aqueous liquid drive fluids injected in the proportion of about 5 to 15 volumes of gas per volume of aqueous liquid as measured at reservoir conditions of temperature and pressure. Oil and other produced fluids are recovered from the production well. The drive fluid can be injected in the form of successive alternate slugs of gas and liquid, or the gas and aqueous liquid can be simultaneously injected into the reservoir. The gas remains in the gaseous state under reservoir conditions.

---

Figure 1:
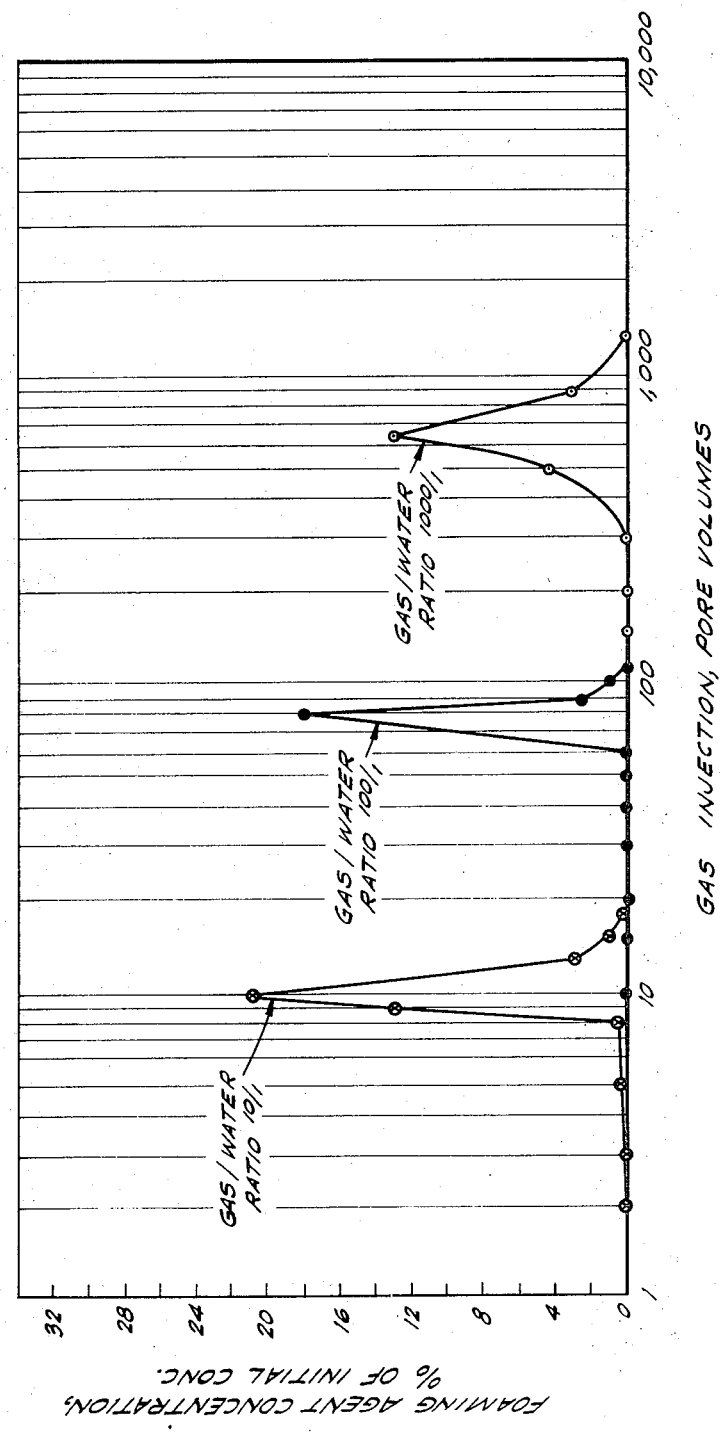

This invention relates to the recovery of oil from subterranean reservoirs and more particularly concerns an improved foam drive process for recovering oil from porous reservoirs.

It has long been recognized that substantial amounts of oil remain unrecovered at the completion of normal primary recovery operations. In order to improve the recovery of oil, it has been proposed to supplement the native reservoir energy by the injection of various fluids to displace oil from the reservoir to a production well. It is known that the areal efficiencies and oil displacement efficiencies can be improved by flooding the reservoir with foam, or by injecting a bank of foam ahead of a conventional drive fluid. In one mode of operation, it is proposed that foam be generated at the surface by intimately contacting an aqueous solution of foaming agent with a gas. The resulting foam is injected into the oil-bearing reservoir through an injection well in communication with the productive zones. However, this mode of operation has not been commercially successful because of the difficulty encountered in injecting foam into the porous formation and in displacing or driving the injected foam through the formation.

In another mode of operation, it is proposed that the foaming agent, or an aqueous solution of the foaming agent, be injected into the formation and followed by a gas drive. Foam is formed within the interstitial passages of the porous reservoir rock by the injected gas contacting the previously injected foaming agent. Ideally, gas in reservoirs in which foam is utilized to displace oil through the formation. In order to carry out a foam flood, it is necessary to transport the foaming agent from the injection well to the producing well. However, it has been found that although foam can be effectively formed in this manner, it is not readily transported over long distances by gas drive. Therefore, need exists for a method of forming a foam bank in a porous oil reservoir and for moving the foam bank through the reservoir to displace oil toward a spaced production well.

Accordingly, a primary object of the present invention is to provide a method for recovering oil from porous oil-bearing reservoirs. Another object of the invention is to provide a method for recovering oil from porous reservoirs in which foam is utilized to displace oil through the reservoir to a production well. A further object of the invention is to provide an effective method for transporting a foam bank through an oil reservoir whereby oil is displaced from the reservoir to a production well. These and other objects of the invention will be apparent from the following detailed description of the invention.

Briefly, this invention contemplates a foam-drive process for recovering oil from porous subterranean reservoirs in which a bank of foam is established in the reservoir and displaced through the reservoir toward a spaced production well by the injection of a combination of gaseous and aqueous liquid drive fluids injected in the proportion of about 5 to 15 volumes of gas per volume of aqueous liquid. Oil and other produced fluids are recovered from the production well. The drive fluid can be injected in the form of successive alternate slugs of gas and liquid, or the gas and aqueous liquid can be simultaneously injected into the reservoir. The foam bank is effectively transported through the formation by the critical combination of gas and aqueous liquid drive fluids, thereby effecting a maximum recovery of oil.

The foam bank can be established in the reservoir by contacting at the surface an aqueous solution of a surface active agent capable of promoting the formation of stable foam with gas and thereafter conducting the foam through an injection well to the oil-bearing zone under sufficient pressure to force the foam into the porous formation. However, the foam bank is more preferably established in the reservoir by injecting a quantity of surface active foaming agent, or an aqueous solution of the foaming agent, into the reservoir, and thereafter injecting gas in an amount sufficient to cause the formation of foam within the interstitial passages of the porous formation on its contacting the foaming agent, or foaming agent solution therein.

Any water-soluble surface active agent can be employed that is capable of promoting the formation of a stable foam when contacted in aqueous solution by a gas. An example of a suitable water-soluble surfactant is polyoxyethylated octylphenol known commercially under the trademark "Triton X–100." Other examples of suitable foam producing agents include dimethyl didodecenyl ammonium chloride, methyl trioctenyl ammonium iodide, trimethyl decenyl ammonium chloride, dibutyl dihexadecnyl ammonium chloride, and water-soluble salts of esters of $C_3$–$C_6$ sulfo dicarboxylic acids having the general formula

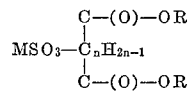

where M is a substituent forming a water-soluble salt, such as alkali metals, ammonium, and substituted ammonium, R is $C_3$–$C_6$ alkyl substitutent, and $n$ is an integer from 1–4, e.g., monosodium dioctyl sulfosuccinate, ammonium dilauryl sulfosuccinate, monosodium dibutyl sebacate, monosodium diamyl sulfoadipate, and others; and water-soluble perfluoroalkanoic acid and salts having 3–24 carbon atoms per molecule, e.g., perfluoro-octanoic acid, perfluoropropanoic acid, perfluorononanoic acid.

Typical of other surface active agents which may be used in the practice of this invention are:

| Trademark: | Chemical name |
|---|---|
| Aerosol C-61 | Ethanolated alkyl guanidine-amine complex. |
| Aerosol OS | Isopropyl naphthalene sodium sulfonate. |
| Aerosol OT | Diocetyl sodium sulfosuccinate. |
| Arquad 2C | Dicoco dimethyl ammonium chloride |
| Arquad T | Tallow trimethyl ammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT-60 | Condensation of hydrogenated tallow amide and ethylene oxide. |
| Hyonic FA-75 | Modified fatty alkylolamide. |
| Miranol HM concentrate | Ethylene cyclomido 1-lauryl, 2-hydroxy ethylene sodium alcoholate, methylene sodium carboxylate. |
| Miranol MM concentrate | Same as Miranol HM except myristyl group is substituted for lauryl group. |
| Nacconal NR | Alkyl aryl sulfonate. |
| Ninol AA62 | Lauric diethanolamide. |
| Ninol 1001 | Fatty acid alkanolamide. |
| Petrowet R | Sodium alkyl sulfonate. |
| Pluronic L44 | Condensation product of ethylene oxide with propylene glycol |
| Product BCO | C-cetyl betaine. |
| Renex 650 | Polyoxyethylene alkyl aryl ether. |
| Sorbit AC | Sodium alkyl naphthalene sulfonate. |
| Sulfanole FAC | Sodium salt of fatty alcohols, sulfated. |
| Triton AS-30 | Sodium lauryl sulfate. |
| Triton X-100 | Alkyl aryl polyether alcohol. |
| Span 20 | Sorbitan monolaurate. |
| Span 40 | Sorbitan monopalmitate. |
| Span 85 | Sorbitan trideate. |
| Tween 65 | Polyoxyethylene sorbitan tristearate. |
| Tween 81 | Polyoxyethylene sorbitan monoleate. |
| OPE 1 | Octylphenoxyethanols. |
| OPE 2 | Octylphenoxyethanols. |
| OPE 3 | Octylphenoxyethanols. |
| Triton GR-7 | Dioctyl sodium sulfosuccinate. |
| Triton B-1956 | Modified phthalic glycerol alkyl resin. |
| Triton X-45 | Isocytyl phenyl polyethoxy ethanol. |

Preferably, the surfactants utilized in this invention are those which form a stable foam in the presence of crude oil, and in reservoirs where the interstitial water contains a high concentration of salt, a surfactant is used which foams readily in the presence of oil and brine. A preferred surfactant found particularly useful in promoting the formation of foam in oil-bearing reservoirs is a surface active composition marketed by Procter & Gamble Company under the trademark O.K. Liquid and described in U.S. Pats. Nos. 2,941,950 and 3,330,346. Another preferred surface active agent for promoting the formation of foam in oil-bearing reservoirs is an alkyl polyethylene oxide sulfate composition marketed by General Aniline and Film Corporation under the trademark Alipol CD-128 and described in copending application Ser. No. 672,465 filed Oct. 3, 1967.

While many of the surfactants utilized in accordance with the invention may be injected into the formation by themselves, it is preferred that they be utilized in the form of aqueous solutions. Therefore, it should be understood that many surfactants which are primarily oil-soluble nevertheless have sufficient water solubility to permit their use in aqueous solutions, and have the ability to form tenacious foams under reservoir temperatures and pressures.

The concentration of surfactant in the aqueous solution employed in accordance with this invention will depend in large part on the particular agent utilized and the type of formation which is to be produced. For instance, where a particular type of formation creates a condition under which much of the surfactant is adsorbed in the interstices of the formation, it will be necessary to employ a greater amount of surfactant so that sufficient surfactant will remain to form a foam bank within the rservoir on the subsequent injection of a gas. Surfactant concentrations between about 0.01 to 10 weight percent of the solution in which they are incorporated are generally suitable for purposes of the invention with the preferable concentration being about 0.1 to 1.0 weight percent.

The quantity of surfactant vehicle or carrier will depend largely upon such well recognized factors as the recovery pattern, spacing between wells, the porosity of the formation, and the thickness of the formation. Ideally the quantity of vehicle or carrier employed should be such that a sufficient amount of liquid is available to completely foam the surfactant solution upon the intimate contact of the solution with the gas. Since the amount of solution required to accomplish this cannot be precisely determined in advance, the most convenient method for expressing the quantity of surfactant solution to be used is in terms of reservoir pore volume. In general, from about .01 to 0.3 pore volume of solution will be utilized with the preferred range being about 0.05 to 0.10 pore volume. Quantities in the upper part of this range may be required for operations in which relatively dilute solutions are employed or in which surfactants having an affinity to absorb upon the rock to a relatively high degree are used. Lesser quantities may be utilized where the surfactant employed is a highly effective one and where the concentration of the solution is high.

Following the injection of the foam, or in the preferred embodiment wherein foaming agent or a solution of foaming agent is injected into the formation, there is injected a combination of gaseous and aqueous liquid drive fluids maintained in the proportion of about 5 to 15 volumes of gas (measured at reservoir conditions of temperature and pressure) per volume of aqueous liquid injected into the formation. The gasiform driving fluid is selected so that it will remain as a gas at both injection conditions and under conditions encountered in the rservoir. Suitable gases include natural gas, methane, ethane, nitrogen, air, carbon dioxide, engine exhaust gases, mixtures of these gases, and other similar gases. The aqueous liquid drive fluid can be water or brine and the like. The combined gaseous and aqueous liquid drive fluids can be injected in alternating slugs of gas and liquid, or the fluids can be simultaneously injected in the form of a gas-liquid mixture, so long as the critical ratio of gas to aqueous liquid is maintained.

Thus, in one embodiment of the invention, the foaming agent, or foaming agent solution, is followed by the injection of successive alternating slugs of gas and liquid until the desired recovery of oil is attained, as usually indicated by the producing water/oil ratios becoming excessive. It is preferred that the aqueous liquid be injected in slugs of about 0.01 to 0.1 pore volume and that the amount of gas injected in each slug be controlled to maintain the gas/water ratio between about 5 to 15 volumes of gas per volume of liquid.

In another embodiment of the invention, the foaming agent, or foaming agent solution, is followed by the injection of a mixture of drive gas and aqueous liquid drive fluid injected in the proportions of between about 5 and 15 volumes of gas per volume of aqueous liquid. In this embodiment, gaseous drive fluid and aqueous liquid drive fluid are simultaneously injected through an injection well and into the reservoir to displace oil and other fluids towards a spaced production well. These fluids are recovered from the production well in conventional manner.

Thus, in the embodiments of this invention wherein the gaseous and aqueous liquid drive fluids are injected either successively or as alternate slugs, it is preferred that the ratio of gas to liquid injected be controlled in the ratio of about 5/1 to 15/1.

In carrying out the process of the invention, the surfactant or surfactant solution is first injected into the reservoir through one or more injection wells arranged in a logically spaced pattern. Five-spot, seven spot, line drive, or other conventional well patterns may be utilized and generally are preferable. After a sufficient amount of surfactant to effect the formation of a tenacious foam bank within the formation has been introduced, a gaseous drive fluid or a mixture of a gasiform fluid and an aqueous liquid are injected to displace the surfactant into the reservoir, and to form a bank of foam therein. The driving fluid will consist of the injection of alternate slugs of gas and aqueous liquid, or a mixture of gas and aqueous liquid simultaneously injected into the reservoir. In either case, the volume of gas and liquid injected is controlled to maintain the proportion of the gaseous and liquid drive fluid within the range of about 5 to 15 volumes of gas per volume of liquid injected. Upon the introduction of the gas, the gas will tend to channel through the formation until it reaches the surfactant or surfactant solution at which time a tenacious foam bank is formed within the interstices of the formation. Gas injection will be somewhat restricted until injection of the aqueous liquid is commenced, whereupon the foam bank will move through the reservoir toward the open producing wells thereby displacing formation fluids, such as connate water and petroleum oil, before it, and will also confine the driving fluid within a relatively finite area. Although the recovery operation can be discontinued at any time, gas and aqueous liquid injection is conventionally continued until the fluids produced from the production well have a relatively low oil content thereby indicating that further recovery of petroleum oil from the subterranean formation is uneconomical.

In still another embodiment of this invention, after the initial surfactant or surfactant-containing solution has been injected into the reservoir, a substantially surfactant-free, non-gaseous displacing liquid is injected through the injection well and into the formation in an amount sufficient to displace the initially injected surfactant or surfactant solution outwardly into the formation a distance of about 10 to 50 feet from the well. Thereafter, alternate slugs of gas and aqueous liquid or mixtures of gas and aqueous liquid driving fluid are injected to form a bank of foam in the reservoir and to move the foam bank through the reservoir. Displacement of the surfactant outwardly into the reservoir prior to injecting gas prevents the formation of any substantial quantity of foam immediately adjacent to the well that will restrict injection of the subsequently injected drive fluids.

By the formation of foam within the reservoir preceding the principal drive fluid, and driving the foam through the reservoir with a combined gaseous and aqueous liquid drive fluid, additional oil is recovered because the generated foam is more effectively moved through the formation and tends to invade the larger capillaries or interstices of the formation, thereby diverting the remainder of the foam and drive fluid into the smaller interstices or capillaries. In addition, a foam bank provides a more favorable drive fluid mobility ratio, improves conformance and displacement efficiency, and results in more complete displacement of oil from the reservoir.

The invention is further described by the following examples which are illustrative of specific modes of practicing the invention and are not intended as limiting the scope of the invention as defined by the appended claims.

EXAMPLE 1

The effectiveness of a combined gas/water drive in transporting foaming agent through porous earth formations is illustrated by the following test. A number of substantially identical sand packs are prepared to simulate cores of an earth formation and saturated with water.

The poor foam transport property of gas is illustrated by injecting a 0.1 pore volume slug of aqueous foaming agent solution into one of the water saturated cores and then passing nitrogen gas through the sand pack to form foam therein and to drive the foam through the core. Liquid displaced from the core is collected and analyzed for the presence of foaming agent. No foaming agent is detected in the effluent liquid, even after 100 pore volumes of gas is passed through the core.

This test is repeated on other of the water saturated cores by driving the foam with alternate slugs of gas and water maintained at various volumetric gas/water ratios. The maximum concentration of foaming agent in the effluent liquid occurs after the injection of only 10 pore volumes of gas at a gas/water ratio of 10/1. Results of these tests are summarized in Table I and illustrated graphically in FIG. 1 which is a plot of the Foaming Agent Concentration of the Effluent Liquid (expressed as a percentage of the concentration of foaming agent in the injected solution) vs. Drive Fluid Gas/Water Ratio.

TABLE 1

| Pore volumes gas, percent | Foaming agent concentration [1] | | |
|---|---|---|---|
| | Gas/water ratio 10/1 | Gas/water ratio 100/1 | Gas/water ratio 1000/1 |
| 2 | 0 | 0 | 0 |
| 3 | 0 | 0 | 0 |
| 5 | 0.1 | 0 | 0 |
| 8 | 0.2 | 0 | 0 |
| 9 | 13 | 0 | 0 |
| 10 | 21 | 0 | 0 |
| 12 | 3 | 0 | 0 |
| 15 | 1.5 | 0 | 0 |
| 18 | 0.2 | 0 | 0 |
| 20 | 0 | 0 | 0 |
| 30 | | 0 | 0 |
| 40 | | 0 | 0 |
| 50 | | 0 | 0 |
| 60 | | 0 | 0 |
| 80 | | 18 | 0 |
| 90 | | 2.6 | 0 |
| 100 | | 1.5 | 0 |
| 110 | | 0 | 0 |
| 150 | | | 0 |
| 200 | | | 0 |
| 300 | | | 0.1 |
| 500 | | | 4 |
| 750 | | | 13 |
| 990 | | | 3 |
| 1300 | | | 0 |

[1] Percent of initial concentration.

It is apparent from the foregoing that combined gas and water drive fluids in the proportion of 10 volumes of gas per volume of water transport foaming agent through a porous structure much more efficiently than either gas alone or combined gas and water drives at higher gas/water ratios.

EXAMPLE 2

The oil recovery efficiencies of a number of fluid drives are compared in the following tests. A Boise sandstone core 8 feet long is initially saturated with 67.5% crude oil and 32.5% water and then water flooded in conventional manner. The oil displaced from the core is collected and measured. Water flooding to residual oil saturation recovered about 55.5 percent of the oil.

The core was resaturated with crude oil and a second test made by injecting 0.1 pore volume of 1% aqueous foaming agent solution into the core and then injecting gas to form foam and to drive oil from the core. Several additional foam floods are performed using alternate slugs of gas and water as drive fluid, 0.1 pore volume of water being injected in each slug and the gas being injected in the amounts of 5, 10, 15 and 100 volumes of gas, respectively, per volume of water. Oil recoveries are determined.

Figure 2:
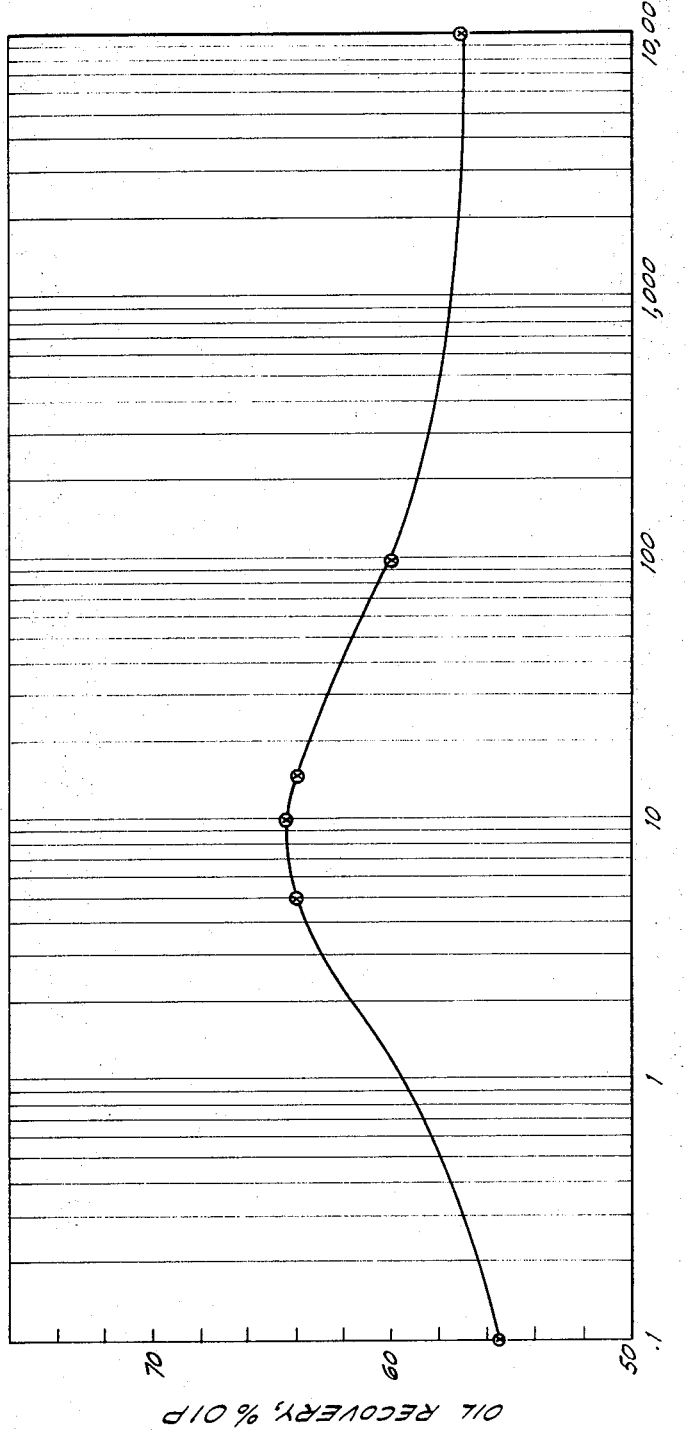

The results of the foregoing tests are reported in Table 2 and illustrated graphically in FIG. 2 which is a plot of the percent oil recovery vs. drive fluid gas/water ratio. It should be noted that the points for "0" gas/water ratio and "infinite" gas water ratio, are plotted at the extreme ends of the abscissa.

TABLE 2

| Test No. | 1 | 2 | 3 | 4 | 5 | 6 |
|---|---|---|---|---|---|---|
| Displacement type | Water flood. | Foam flood. | Foam flood. | Foam flood. | Foam flood. | Foam flood. |
| Drive fluid | Water | Gas | Gas and water. | Gas and water. | Gas and water. | Gas and water. |
| Gas/water ratio | 0 | 00 | 100/1 | 15/1 | 10/1 | 5/1. |
| Oil recovery, percent[1] | 55.5 | 57.0 | 60.0 | 64.0 | 64.4 | 64.0. |

[1] Percent of oil-in-place initially.

These tests demonstrated that a foam flood recovers more oil than a water flood and that maximum oil recovery is obtained with a foam flood displaced by gas and water in the proportion of about 10 volumes of gas per volume of water.

EXAMPLE 3

A commercial scale foam flood is conducted using the improved drive fluid of this invention. The flood is carried out on an oil sand depleted to economic limits by conventional primary recovery. A conventional five-spot pattern is employed with four injection wells located in a square pattern and a single producing well located at the center.

The flood is initiated by injecting 0.05 pore volume of an aqueous solution containing 1 percent by weight of water-soluble foaming agent. Next, water is injected to displace the foaming agent solution outwardly into the formation a distance of about 20 feet. Then alternate slugs of natural gas and water are injected. The water slugs amount to about 0.1 pore volume and the gaseous slugs to about 1.0 pore volumes each. Oil is recovered from the central producing well.

EXAMPLE 4

Another embodiment of the improved foam flood of this invention is employed in a commercial scale foam flood. This flood is carried out on an oil sand depleted to economic limits by conventional primary recovery and then by water flooding. A line drive flooding pattern is employed in which the injection wells are arranged in a substantially straight line and a plurality of producing wells are arranged in another parallel line spaced apart from the injection wells.

The foam flood is initiated by injecting 0.1 pore volume of an aqueous solution containing 2 weight percent of a water-soluble foaming agent. This solution is caused to foam in the reservoir and is displaced through the reservoir by simultaneously injecting internal combustion engine exhaust gas and water in the proportions of about 5 volumes of gas per volume of water. Oil and other fluids are recovered from the injection wells. Drive fluid injection is continued until the producing water/oil ratios increase to an uneconomical limit.

Various embodiments and modifications of this invention have been described in the foregoing description and examples, and further modification will be apparent to those skilled in the art. Such modifications are included within the scope of this invention as defined by the following claims:

Having now described the invention, I claim:

1. In the method for recovering petroleum from porous subterranean reservoirs wherein a bank of foam is established in the reservoir and thereafter displaced through the reservoirs towards a production well by means of a drive fluid injected through an injection well, and petroleum is recovered from the production well, the improvement which comprises employing as the drive fluid a combination of a gas that remains in the gaseous state under reservoir conditions and aqueous liquid in the proportion of between about 5 to 15 volumes of gas per volume of liquid as measured at reservoir conditions of temperature and pressure.

2. The method defined in claim 1 wherein foam is generated at the surface and injected into the reservoir through the injection well to establish therein said bank of foam.

3. The method defined in claim 1 wherein said foam bank is established by injecting a foaming agent into the reservoir through the injection well, and thereafter injecting gas whereby foam is formed in said reservoir on contact with said foaming agent.

4. The method defined in claim 1 wherein said gas is selected from the group consisting of natural gas, methane, ethane, nitrogen, air, carbon dioxide, engine exhaust gases, and mixtures of said gases.

5. The method defined in claim 1 wherein said aqueous liquid is selected from the group consisting of water and brine.

6. A method for recovering petroleum from a subterranean reservoir penetrated by an injection well and a production well spaced apart in the reservoir, which comprises:

injecting through said injection well and into said reservoir between about 0.1 to 0.3 pore volume of an aqueous solution comprised of water and between about 0.01 to 10.0 weight percent of a foaming agent;

thereafter simultaneously injecting through said injection well and into said reservoir a gas that remains in the gaseous state under reservoir conditions and an aqueous liquid, said gas being injected in the amount of about 5 to 15 volumes per volume of said aqueous liquid as measured at reservoir conditions of temperature and pressure; and recovering petroleum from said production well.

7. The method defined in claim 6 wherein said gas is selected from the group consisting of natural gas, methane, ethane, nitrogen, air, carbon dioxide, engine exhaust gases, and mixtures of said gases.

8. A method for recovering petroleum from a subterranean reservoir penetrated by an injection well and a production well spaced apart in the reservoir, which comprises:

injecting through said injection well and into said reservoir between about 0.01 to 0.3 pore volume of an aqueous solution comprised of water and between about 0.01 to 10.0 weight percent of a foaming agent;

thereafter injecting through said injection well and into said reservoir alternate slugs of a gas that is substantially uncondensed at reservoir conditions and an aqueous liquid, said gas being injected in the amount of 5 to 15 volumes of gas per volume of aqueous liquid as measured as reservoir conditions of temperature and pressure; and recovering petroleum from said injection well.

9. The method defined in claim 8 wherein said gas is selected from the group consisting of natural gas, methane, ethane, nitrogen, air, carbon dioxide, engine exhaust gases, and mixtures of said gases.

10. The method defined in claim 8 wherein said slugs of aqueous liquid are injected in an amount between about 0.01 to 0.1 pore volume.

11. The method defined in claim 8 wherein a slug of substantially surfactant-free aqueous liquid is injected into the reservoir following the injection of said foaming agent solution to displace said solution into the reservoir a distance from said well prior to the injection of said gas.

References Cited

UNITED STATES PATENTS

| | | | |
|---|---|---|---|
| 2,866,507 | 12/1958 | Bond et al. | 166—9 |
| 2,875,833 | 3/1959 | Martin | 166—9 |
| 3,249,157 | 5/1966 | Brigham et al. | 166—9 |
| 3,311,167 | 3/1967 | O'Brien et al. | 166—9 |
| 3,318,379 | 5/1967 | Bond et al. | 166—9 |
| 3,342,256 | 9/1967 | Bernard et al. | 166—9 |
| 3,369,601 | 2/1968 | Bond et al. | 166—9 |
| 3,386,506 | 6/1968 | Quance | 166—9 |

JAMES A. LEPPINK, Primary Examiner

I. A. CALVERT, Assistant Examiner

U.S. Cl. X.R.

166—275